UNITED STATES PATENT OFFICE.

CHARLES LOUIS ROYER, OF HALIFAX, ENGLAND.

FULLED RAWHIDE AND PROCESS OF MAKING THE SAME.

SPECIFICATION forming part of Letters Patent No. 456,855, dated July 28, 1891.

Application filed April 26, 1889. Serial No. 308,757. (Specimens.)

*To all whom it may concern:*

Be it known that I, CHARLES LOUIS ROYER, of Halifax, England, a citizen of the United States, have invented a new and useful Improvement in the Manufacture of Leather, of which the following is a full, clear, and exact description.

Picker-straps for looms require to be of great flexibility, strength, and insusceptibility to wear. In order to make a leather which is suitable for these purposes some variations in the manufacture are desirable. The best results that I have hitherto seen in the manufacture of leather for this purpose have been from leather manufactured substantially according to the hereinafter-described process, which I believe to be novel with myself.

A hide having been unhaired in any usual way is thoroughly fulled mechanically in the manner usual for preparing fulled rawhide, care, however, being taken to exclude oil from the fulling process. No advantage arises from the use of any stuffing or filling mixture in the fulling process, the mechanical kneading of the hide in the work of rolling and unrolling it and bending it back and forth in the fulling-machine or other "hide-mill" while tolerably wet being sufficient to open the pores and prepare it sufficiently for the next operation. The fulled rawhide thus prepared without oil or grease is dried and then soaked in a solution of acetate of alumina. This solution may be prepared by making a saturated solution of sulphate of alumina in hot water and another saturated solution of acetate of lead in hot water, the amounts taken being in the proportion of three pounds of the lead salt to two pounds of the alumina salt. These two solutions are then poured together, and the lead and sulphuric acid are precipitated, as sulphate of lead, and the acetate of alumina remains in solution, which is decanted and serves as the bath for the fulled rawhide. It will be seen that this is nearly a saturated solution.

Another and cheaper way of making an acetate of alumina is from sulphate of alumina and carbonate of soda or soda-ash, and the precipitated alumina is washed and then dissolved in acetic acid and a nearly-saturated solution in water is used for the bath. After saturating the fulled rawhide with acetate of alumina, as above described, the hide is dried until the acetic acid and the moisture is evaporated, which can be determined by the disappearance of the sour smell from the leather. This will leave the alumina deposited in the fibers of the leather. The hide is then stuffed with a currying compound, the preferable compound employed being the mixture of cod-oil and birch-tar oil usually employed in the manufacture of so-called "Russia leather." A proportion of birch-tar oil in the vicinity of twenty per cent. of the stuffing compound is a very good proportion; but the proportions may be varied within a much wider range. On account of the expense of the vegetable oil the percentage of this will probably be as low as is convenient and as indicated in the above designated proportions. The leather when stuffed is fulled in order to incorporate the oil thoroughly with the fibers of the leather and with the alumina. It is probable that there is a chemical combination to some extent between the oil and the alumina, which chemical combination is not readily attacked by water, so that the leather thus made is quite insusceptible to the action of moisture. The leather thus made is exceptionally tough, pliable, water-proof, and unsusceptible to wear, so that it has given remarkable results as a material for picker-straps. It is probable, also, that this leather would serve a good purpose as an upper leather for shoes.

The use of acetate of alumina in the arts as a mordant in dyeing, particularly with madder, has long been known, and it is possible that it has been used for that purpose in coloring leather; but I am not aware that it has been used in the manufacture of untanned and uncolored leather or in connection with the fulling process for rawhide.

A great difficulty with fulled rawhide hitherto has been its susceptibility to the action of moisture; but it is well known that alumina is what is called in the arts a "repellent," and has been used in the manufacture of repellents by soaking flannels, satinets, kerseymeres, and other cloths in a solution of acetate of alumina. This was the process employed by the Salisbury Manufacturing Company of Massachusetts in the year 1860, and later in the preparation of their repellents; but these goods were not leather and were not treated with oil, and were not dyed subsequent to the alumina treatment. It is also true that in the manufacture of repellents after the finishing of a cloth it has been saturated with an alumina soap; but this manufacture was injurious to the cloth, stiffened it and hardened it, and it was not done in the same series of manipulations as the present manufacture.

I claim as my invention and desire to secure by Letters Patent—

1. A process of treatment of fulled rawhide by the deposition in its pores after fulling of acetate of alumina from a solution in which the fulled rawhide is placed, after which deposition the fulled rawhide is dried and the acetic acid evaporated from the deposited acetate of alumina, the said two processes being conducted before the application of any oil or grease to the hide and the drying of the hide after the deposition of acetate of alumina in its pores, being followed by stuffing with oil or grease, preferably a Russia-leather-currying compound, and a subsequent fulling, substantially as and for the purpose described.

2. A tough, flexible, and durable fulled rawhide permeated with acetate of alumina and dried until the acetic acid has so far evaporated that its presence is hardly perceptible to the sense of smell, and stuffed with a Russia-leather-currying compound, substantially as and for the purpose described.

CHARLES LOUIS ROYER.

Witnesses:
J. M. DOLAN,
A. B. MERRILL.